United States Patent [19]

Hoene et al.

[11] 4,054,815

[45] Oct. 18, 1977

[54] CIRCUIT ARRANGEMENT FOR IGNITING A GAS DISCHARGE FLASH TUBE

[75] Inventors: Ernst-Ludwig Hoene, Jalan Piala, Singapore; Werner Rech; Josef Zimlich, both of Taunusstein, Germany

[73] Assignee: Siemens Aktiengesellschaft, Berlin & Munich, Germany

[21] Appl. No.: 674,648

[22] Filed: Apr. 7, 1976

[30] Foreign Application Priority Data

Apr. 15, 1975 Germany .......................... 2516414
Nov. 24, 1975 Germany .......................... 2552670

[51] Int. Cl.² .......................................... H05B 41/23
[52] U.S. Cl. .................................. 315/241 R; 315/173; 315/240; 354/135
[58] Field of Search ............ 315/241 R, 241 P, 241 S, 315/227 R, 232, 235, 240, 171, 173; 354/126, 135, 142, 145

[56] References Cited

U.S. PATENT DOCUMENTS

| | | | |
|---|---|---|---|
| 3,782,258 | 1/1974 | Boekkooi et al. | 315/241 R X |
| 3,800,187 | 3/1974 | Ludloff | 315/241 P X |
| 3,882,358 | 5/1976 | Deskevich et al. | 315/240 X |

FOREIGN PATENT DOCUMENTS 2,110,752  9/1972  Germany .......................... 315/241 P

*Primary Examiner*—Eugene R. La Roche
*Attorney, Agent, or Firm*—Hill, Gross, Simpson, Van Santen, Steadman & Chiara

[57] ABSTRACT

A circuit arrangement for igniting a gas discharge flush tube in which the flash tube is arranged in the circuit of a voltage source in parallel to a flash capacitor and the flash tube is connected to an ignition voltage generator which emits high voltage pulses during operation of the circuit arrangement. The ignition voltage generator has a low impedance, in particular low inductance, and the high voltage pulses produced thereby initiate ignition of and at least approximately adiabatically head a plasma channel in the flash tube. The ignition voltage generator is fundamentally capacitive. In one embodiment of the invention it comprises a second voltage source for charging a second capacitor connected in parallel with the flash tube, whereas in another embodiment the ignition voltage generator contains a piezoelectric crystal or a pyro electric crystal.

7 Claims, 2 Drawing Figures

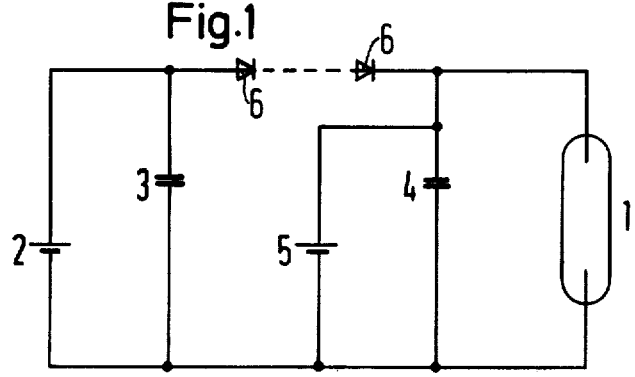
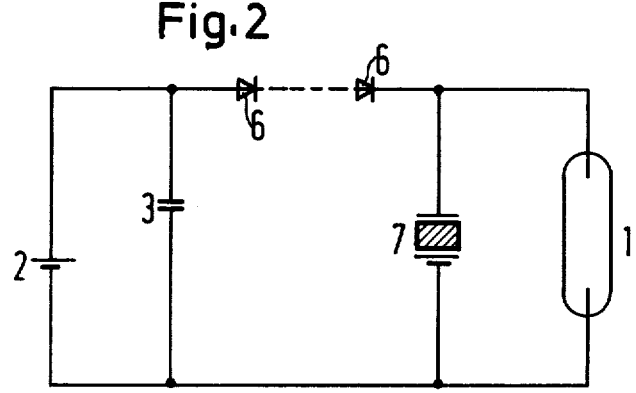

CIRCUIT ARRANGEMENT FOR IGNITING A GAS DISCHARGE FLASH TUBE

BACKGROUND OF THE INVENTION

1. Field of the Invention

The present invention relates to a circuit arrangement for igniting a gas discharge flash bulb (flash tube) which is arranged in the circuit of a voltage source in parallel to a flash capacitor, and more particularly to such an arrangement in which the flash tube is also connected to an ignition voltage generator which emits high voltage pulses when the circuit arrangement is in operation.

2. Description of the Prior Art

Heretofore, the high voltage pulses required for ignition purposes have always been produced in inductive ignition voltage generators such as ignition transformers. In this connection one may refer to the German published application No. 2,422,201, FIG. 1 or to the German published application No. 1,801,600. These ignition transformers have been connected either in parallel to the flash tube between the one main electrode and an outer ignition electrode, or between the two main electrodes (parallel ignition), or, however, connected directly into the discharge circuit of the tube (series ignition). Both types of connections have their specific advantages, but in the following respect are not always completely satisfactory. In order to ensure that a flash is always reliably triggered following the ignition of the tube, the tube voltage, referred to as the "anode voltage", supplied by the flash capacitor as heretofore normally been required to be a multiple greater than the theoretically required burning voltage, i.e. it was necessary to over dimension the d.c. voltage source.

SUMMARY OF THE INVENTION

The primary object of the present invention is to overcome the above disadvantage which has existed in the art for decades.

In order to realize the above objective, in a circuit arrangement of the type generally described above, it is provided that the ignition voltage generator have such a low impedance, in particular a low inductance, that the high voltage pulses which is emitted thereby at least approximately adiabatically heats the plasma channel which forms as a result of the ignition process in the flash tube.

The invention is based upon the following considerations. The tube ignition and tube discharge are carried out in a known manner in that between the main electrodes of the tube the high voltage pulse initially forms a filament-like, conductive plasma channel, also called a "plasma filament" or a preliminary channel, which is then expanded by the anode voltage and becomes the luminous plasma, the actual discharge. In order that a comparatively low anode voltage, which is similar to the burning voltage, can expand the pulse-produced "plasma filament", the latter must be of a sufficiently low impedance. Recent investigations have indicated that a fixed relationship can be established between the conductivity of the preliminary channel and the energy applied for its production, only, however, when the period of time required to feed in the energy is short in comparison to the period of time in which the channel can emit the energy stored therewithin into the environment as a result of heat conduction and radiation losses (adiabatic heating). In this case, the filament resistance reduces with increasing energy supply in a specific functional dependence.

The previously employed ignition transformers possess high secondary impedances as they must emit high-f frequency voltages with amplitudes of a few kV, and their primary end peak current strengths are limited by the danger of switching contact overloads and switching thyristor overloads. These high impedances do not permit large current increases in the ignition circuit, with the result that the preliminary channel which is forming is also not heated approximately adiabatically and thus reaches a state of conductivity at which it can only be transformed into the desired flash discharge by an anode voltage which exceeds the burning voltage by a multiple. Based on the knowledge of these interrelationships, a circuit arrangement constructed in accordance with the present invention comprises a low impedance ignition voltage generator which, when of suitable design, facilitates an at least approximately adiabatic filament heating and thus initially converts the given ignition energy into the maximum possible filament conductivity and, furthermore, also in particular ensures a reliable flash tube discharge even under anode voltages which are similar to the burning voltage.

A low impedance, in particular a low inductance, ignition voltage generator can be constructed, for example, by adding capacitances to an ignition transformer. However, it is also possible to reduce the inductive impedance component of the transformer itself, possibly by selecting a transformer core having a low permeability. Preferably, the ignition voltage generator is set up for an ignition electrode-free parallel ignition.

Advantageously, the ignition voltage generator of the proposed circuit arrangement possesses only a capacitive impedance component. If a conventional capacitor which can be charged by a second voltage source is used, the resistance of this voltage source (the internal resistance in the case of a d.c. source) is to be very much greater than the internal resistance of the flash tube on the initiation of the actual discharge, so that the flash capacitor is not discharged by way of this voltage source even without the assistance of additional blocking means. Instead of a conventional capacitor, however, it is also possible to use other capacitances, in particular piezoelectric crystals or pyro electric crystals. Ignition voltage generators having crystals of this type have proven particularly favorable as the crystal impedance increases with decreasing frequency, and, therefore, the crystals present a comparatively high resistance to the actual low frequency discharge and are thus automatically blocked. On the other hand, because of the fact that the impedance of parallel-connected ignition transformers decreases together with a decreasing frequency, these transformers must generally be protected from the discharge current by means of additional precautions (diodes). Thus, because of their almost ideal matching to the flash tube, capacitive ignition voltage generators lead to further circuitry simplifications.

BRIEF DESCRIPTION OF THE DRAWING

Other objects, features and advantages of the invention, its organization, construction and operation will be best understood from the following detailed description taken in conjunction with the accompanying drawing, in which:

FIG. 1 is a schematic circuit diagram of a first exemplary embodiment of a circuit arrangement constructed in accordance with the invention; and FIG. 2 is a schematic circuit diagram of a second exemplary embodiment of a circuit arrangement constructed in accordance with the present invention.

DESCRIPTION OF THE PREFERRED EMBODIMENTS

Circuit components of an ingnition circuit which do not contribute to the understanding of the present invention, e.g. switching contacts and resistors or the like, have been omitted from the drawing for the sake of clarity.

In the exemplary embodiment of the invention illustrated in FIG. 1, a flash tube 1 is arranged in the circuit of a d.c. voltage source 2 in parallel to a flash capacitor 3 and an ignition voltage capacitor 4. The ignition voltage capacitor 4 is itself connected into the circuit of a second d.c. voltage source 5. A series of blocking diodes 6 are connected between the ignition voltage capacitor 4 and the flash capacitor 3 and are poled such that the high voltage pulses produced in the ignition voltage capacitor will not be discharged by way of the flash capacitor. A transformer could also be used instead of the d.c. voltage source 5. At the instant of the tube breakdown, the capacitance of the ignition voltage capacitor 4 is dominant in the ignition circuit of the tube.

The arrangement operates as follows: The voltage across the ignition voltage capacitor 4 (ignition capacitance) is increased by the second d.c. voltage source 5 up to the breakdown voltage of the flash tube 1. Then, the ignition capacitance is discharged by way of the flash tube 1 forming a "plasma filament" down to the voltage (anode voltage) which the flash capacitor 3 charged by the first d.c. voltage source 2 makes available to the tube 1. This voltage can be reduced to values which are only insignificantly higher than the burning voltage. When the ignition capacitance is of suitable dimensioning, upon its discharge, the resistance of the "plasma filament" has reduced to such a point that the anode voltage, which is similar to the burning voltage, is sufficient for a further expansion of the "filament" and the actual discharge begins.

The embodiment of the invention illustrated in FIG. 2 differs from the embodiment illustrated in FIG. 1 only inasmuch as the ignition voltage capacitor 4 and the second voltage source 5 have been replaced by a piezoelectric crystal 7 have a pressure generator (not shown). In a series of tests this variant produced the following results: With a high voltage pulse of 3.2 kV and 5 microseconds duration, it was possible to safely ignite a tube with a 20 mm arc length and an internal gas pressure of 800 Torr (xenon filter gas), at an anode voltage of $U_a = 140$ V.

A particularly advantageous use of the invention is that in the field of copying technology in which flash tubes are being used to an increasing extent for the exposure of an original. In this case, flashes of very short duration, i.e. a maximum of a very hundred microseconds are required. With the previously known inductive ignition voltage generators, such short flash times could only be achieved with a considerable technical expense. The use of a circuit arrangement constructed in accordance with the present invention eliminates the problems of inductive ignition; it is now possible to achieve a reliable ignition and a short flash duration with a relatively low technical expense, even in copying devices.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A circuit arrangement for igniting a gas discharge flash tube which has only two electrodes, comprising:
    a voltage source connected in parallel with said flash tube;
    an electronic switch;
    a flash capacitor connected in parallel with said flash tube via said electronic switch; and
    an ignition voltage generator connected to said flash tube, said ignition voltage generator having a low inductance and operable to produce high voltage pulses to ignitite said flash tube forming a plasma channel and at least approximately adiabatically heat the plasma channel.

2. The circuit arrangement of claim 1, wherein said ignition voltage generator has a capacitive impedance and is connected in parallel to said flash tube and, via said electronic switch, to said flash capacitor.

3. The circuit arrangement of claim 2, wherein siad ignition voltage generator comprises an ignition capacitor and another voltage source for charging said ignition capacitor.

4. The circuit arrangement of claim 2, wherein said ignition voltage generator comprises a piezoelectric crystal.

5. The circuit arrangement of claim 2, wherein said ignition voltage generator comprises a pyroelectric crystal.

6. In a photo copying machine of the type in which a gas discharge flash tube, which has only two electrodes, is ignited to cause copying of an original in the copying process, the improvement therein comprising:
    an electronic switch;
    a voltage source connected in parallel with said flash tube via said electronic switch;
    a flash capacitor connected in parallel with said flash tube via said electronic switch; and
    an ignition voltage generator connected in parallel with said flash tube, said ignition voltage generator having a low impedance and operable to initiate and adiabatically heat a plasma channel in said flash tube.

7. A circuit arrangement for igniting a two-electrode gas discharge flash tube comprising:
    an electronic switch;
    a voltage source connected in parallel with said flash tube via said electronic switch;
    a flash capacitor connected in parallel with said flash tube via said electronic switch; and
    an ignition voltage generator connected to said flash tube, said ignition voltage generator having a low impedance and operable to produce high voltage pulses to ignite said flash tube forming a plasma channel and at least approximately adiabatically heat the plasma channel.

* * * * *